United States Patent [19]

Nishida et al.

[11] Patent Number: 4,680,802
[45] Date of Patent: Jul. 14, 1987

[54] POSTURE JUDGEMENT SYSTEM IN IMAGE PROCESSING

[75] Inventors: Yoshie Nishida, Yokohama; Seiji Hata, Fujisawa; Akira Miyakawa, Yokohama, all of Japan

[73] Assignee: Hitachi, Ltd., Tokyo, Japan

[21] Appl. No.: 807,880

[22] PCT Filed: Mar. 25, 1985

[86] PCT No.: PCT/JP85/00144

§ 371 Date: Dec. 23, 1985

§ 102(e) Date: Dec. 23, 1985

[87] PCT Pub. No.: WO85/04502

PCT Pub. Date: Oct. 10, 1985

[30] Foreign Application Priority Data

Mar. 26, 1984 [JP] Japan .................. 59-56200

[51] Int. Cl.$^4$ ............................. G06K 9/00
[52] U.S. Cl. .................... 382/8; 358/101; 358/107; 364/559; 382/25
[58] Field of Search .......... 382/8, 25; 358/101, 358/107; 356/399; 364/559

[56] References Cited

U.S. PATENT DOCUMENTS

| | | | |
|---|---|---|---|
| 3,986,007 | 10/1976 | Ruoff et al. | 364/559 |
| 4,325,125 | 4/1982 | Buchfeld | 358/107 |
| 4,435,835 | 3/1984 | Sakow et al. | 382/8 |
| 4,437,114 | 3/1984 | LaRussa | 358/101 |
| 4,550,432 | 10/1985 | Andersson | 358/107 |

FOREIGN PATENT DOCUMENTS

| | | | |
|---|---|---|---|
| 58-217084 | 12/1983 | Japan | 382/8 |
| 59-2187 | 1/1984 | Japan | 382/8 |

OTHER PUBLICATIONS

Persoon, "A System That can Learn to Recognize Two-Dimensional Shapes", *Philips Tech. Rev.*, 11/12, 1978/79, pp. 356-363.

Bolles et al., "Robust Feature Matching Through Maximal Cliques", *Proc. SPIE Tech. Symposium on Imaging and Assembly*, Apr. 1979, pp. 1-9.

*Primary Examiner*—Leo H. Boudreau
*Assistant Examiner*—Joseph Mancuso
*Attorney, Agent, or Firm*—Fay, Sharpe, Beall, Fagan, Minnich & McKee

[57] ABSTRACT

This invention relates to a system which improves an operation speed and accuracy of judgement when the posture of an object component parts is judged by an image processor. This system determines a combination of parameters used for the posture judgement at the time of the preparation of standard data, classifies the types in accordance with the parameter combinations and makes processing for a parameter combination designated for each type at the time of recognition, thereby judging the posture of the object component parts at a high speed and with a high level of accuracy.

3 Claims, 8 Drawing Figures

POSTURE JUDGEMENT SYSTEM IN IMAGE PROCESSING

DESCRIPTION

1. Technical Field

This invention relates to a method of recognizing component parts or the like by image processing, and more particularly to a posture judgement system suitable for the recognition of a position change or the side of a posture due to the rotation of a component parts.

2. Background Art

In conventional image processing, a method of judging a posture which determines the relation of position of a hole of a component parts and a moment has been employed. In the selection of parameters, however, suitable parameters are determined by a user in accordance with an object whenever recognition is made. For this reason, the judgement system greatly relies upon the user itself and system development has not necessarily been satisfactory and efficient.

DISCLOSURE OF INVENTION

With the background described above, the present invention contemplates to provide a posture judgement system having a high operation speed and high accuracy in the recognition of component parts by image processing.

The posture judgement system in accordance with the present invention first determines the combinations of those parameters which are used for posture judgement at the time of preparation of standard data, then classifies types by these combinations, and processes the parameter combination designated for each type at the time of recognition in order to judge the posture of a desired component parts.

Since the present invention automatically generates recognition data for "an" arbitrary component parts, it does not need programming relating to the posture judgement for each object. Since the present invention calculates only necessary and sufficient parameters at the time of recognition, the operating speed can be improved. Furthermore, since the accuracy of each parameter is evaluated and guaranteed, the accuracy of judgement becomes high.

These and other objects, features and effects of the present invention will become more apparent from the following description when taken in conjunction with the accompanying drawings.

BRIEF DESCRIPTION OF DRAWINGS

FIG. 7 is a flowchart useful for explaining further definitely a part of the processing flows shown in FIG. 6.

Best Mode for Carrying Out the Invention

Hereinafter, an embodiment of the invention will be described with reference to the accompanying drawings.

Figure 1:
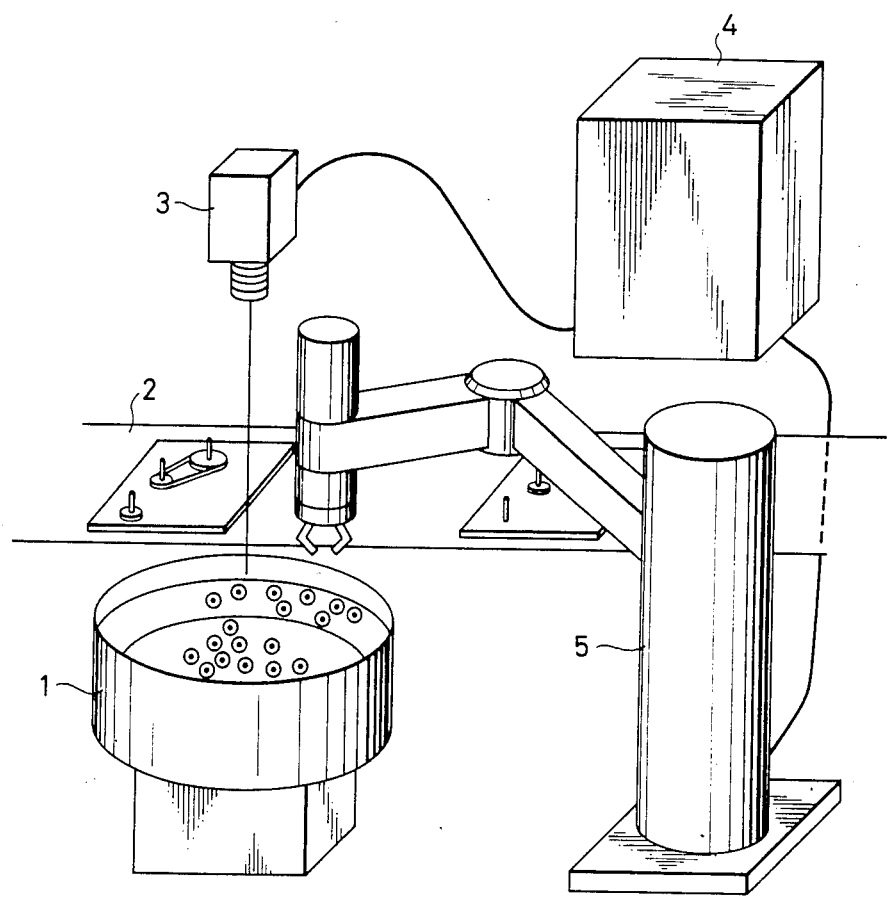
FIG. 1 shows an example of a system to which the posture judgement system of the present invention is applied.

FIG. 1 shows the construction of an automatic assembly system embodying the posture judgement system of the present invention.

This system assembles those component parts which are being supplied by a rotary parts feeder 1 to chassis that is being carried on a belt conveyor 2. First of all, the image of a component parts on the rotary parts feeder 1 is inputted by a TV camera 3 and is transferred to an image processor 4. The image processor 4 recognizes the existence of the component parts to be assembled from the input image, and if such "a" parts exists, it calculates the position and posture of the component parts and transfers the data to an assembly robot 5. The assembly robot 5 picks up and assembles the component parts on the basis of the data sent from the image processor 4. The rotary parts feeder 1 supplies the component parts piled up on a disc at the center to a truck around its outer periphery. The component parts assume two-dimensionally arbitrary positions and postures on the truck. Therefore, the directions of the component parts must be known in order that the assembly robot 5 can pick them up.

Figure 2:
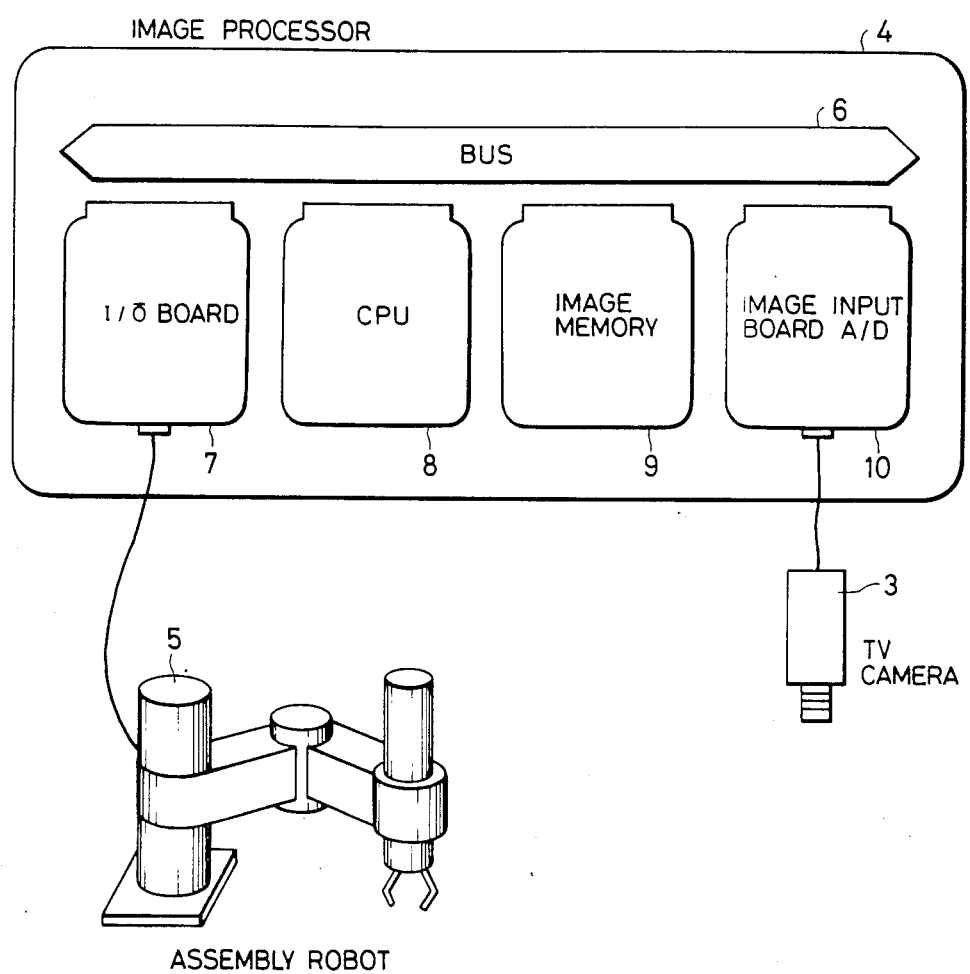
FIG. 2 shows the construction of an image processor.

The construction of the image processor 4 shown in FIG. 1 is illustrated in FIG. 2. The image processor 4 receives the image from the TV camera 3 through its image input board 10, converts it to a digital value representing the luminance intensity of each pixel in the image, and makes binarization with respect to the profile of the image. The data thus obtained are stored in an image memory 9, and a processing unit 8 makes posture judgement processing to recognize the position and posture of the component parts and transfers the data to the assembly robot 5 through a bus 6 and an input/output board 7 (I/O).

Figure 3:
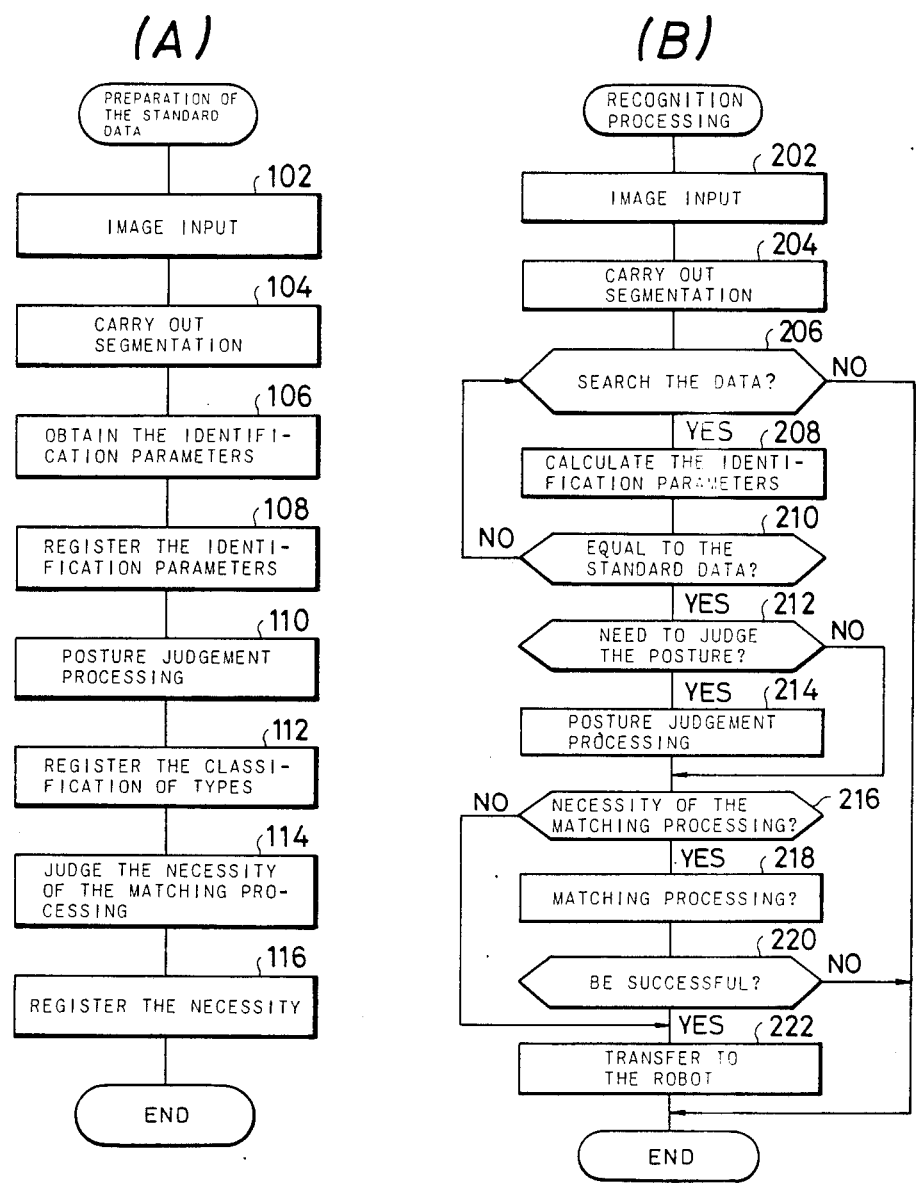
FIG. 3 is a flowchart showing the processing flows of the posture judgement in the present invention.

FIG. 3 is a flowchart of one embodiment of the posture judgement system of the present invention, wherein (A) shows the flow of preparation of the standard data and (B) shows the flow of the recognition processing. Hereinafter, the flow the preparation of the standard data and the flow of recognition will be described with reference to FIG. 3. Both of these processings input the image through the TV camera 3 (102, 202), effect binarization and carry out segmentation (labelling) which segments the regions into black and white masses (104, 204).

Next, at the time of the preparation of the standard data, identification parameters (area, number of holes, etc.) used for correcting threshold values are first obtained (106) as shown in FIG. 3(A), and the identification parameters obtained as the standard data are then registered (108). Next, a parameter combination which can most accurately determine the posture in the posture judgement processing is selected from the parameters shown in FIG. 4 (110) and the classification of types by such parameters is effected and registered (112). Whether or not matching processing is necessary is judged (114) and the necessity is registered (116).

At the time of recognition, after segmentation is made, the data which is analogous to the component parts inputted from the standard data is searched (206) as shown in FIG. 3(B), and the identification parameters of the inputted component parts are calculated (208) and are then compared with the standard data (210).

When they are in agreement with each other, whether or not the posture must be recognized is judged (212), and whenever necessary, the posture judgement processing is effected in accordance with the parameters for each type designated at the time of the preparation of the standard data (214). Matching processing with the standard data is effected in accordance with this posture judgement (216), and the recognition of the component parts is effected in accordance with the degree of coincidence of the superposed areas (218). The data of the component parts are transferred to the robot for those for which matching proves to be successful (220, 222).

Figure 4:
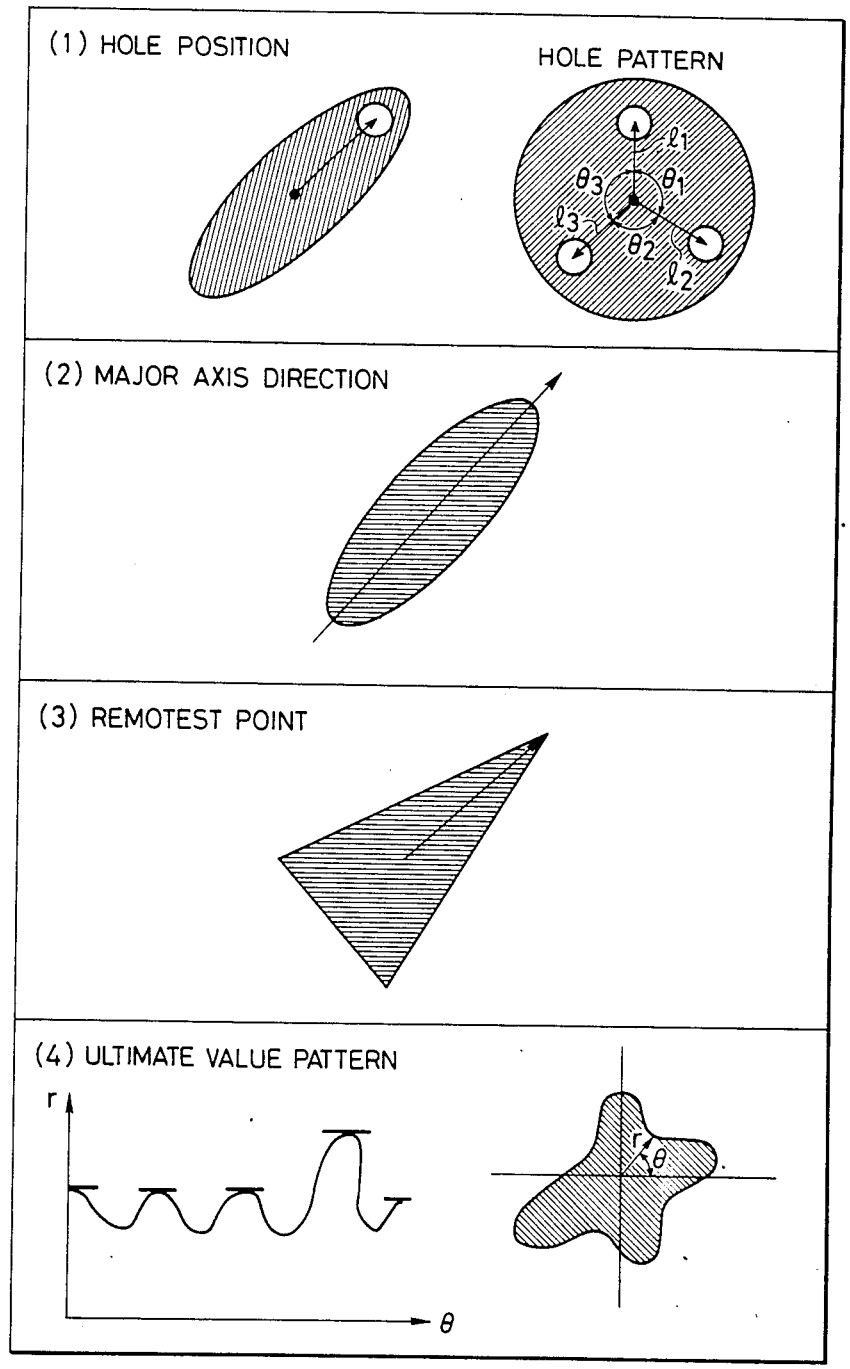
FIG. 4 is an explanatory view of posture judgement parameters in the present invention.

FIG. 4 is an explanatory view of the posture judgement parameters in the posture judgement system of the present invention.

Each parameter will be explained in detail.
(1) Hole position . . . Correspondence is established around the center of gravity of the component parts by angles and lengths with respect to a line connecting the center of gravity of the component parts and the center of gravity of each hole.
(2) Secondary moment . . . Major axis of inertia by the secondary moment of the component parts.
(3) Remotest point . . . The longest distance connecting the center of gravity and the profile line.
(4) Ultimate values . . . The point at which the distance connecting the center of gravity and the profile line changes from the increase to the decrease. A plurality of such points exist for an image pattern.

Figure 5:
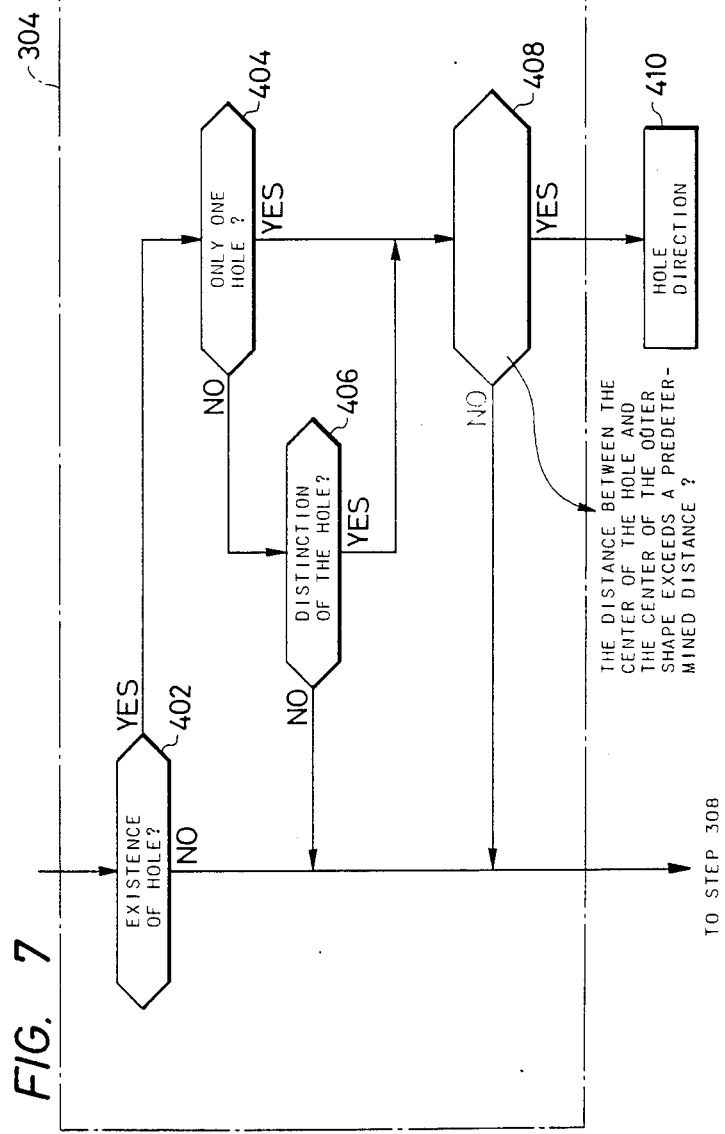
FIG. 5 shows a table for storing posture judgement parameters.

The parameters described above are obtained and stored in a table shown in FIG. 5.

Figure 6:
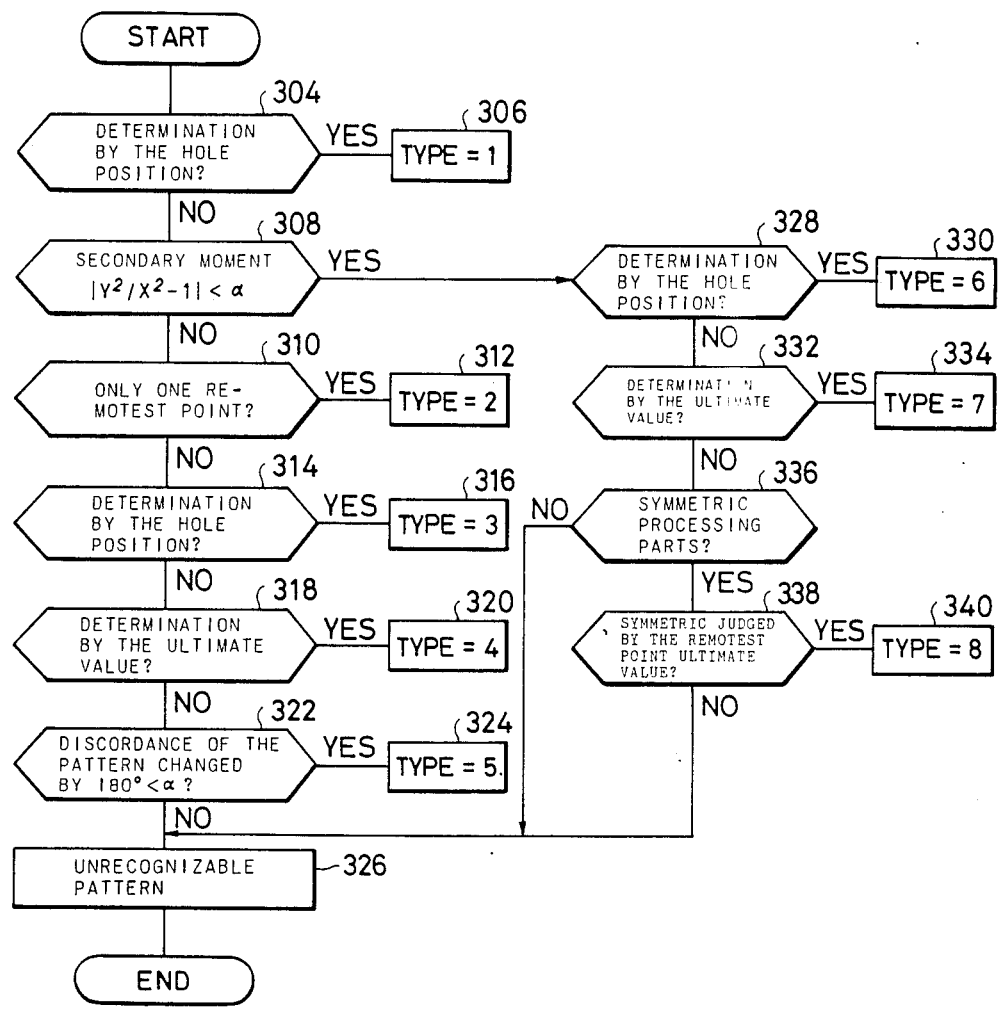
FIG. 6 is a flowchart showing the processing flows for determining the posture judgement parameters at the time of preparation of the standard data.

Next, FIG. 6 shows the detailed flow of processing of the posture judgement processing (110) at the time of the preparation of the standard data (FIG. 3(A)) of the posture judgement system of the present invention.

The posture judgement judges whether or not the posture judgement is possible for each parameter in accordance with the following procedures, determines a parameter combination in accordance with the result obtained, and classifies the component parts into eight types in accordance with the combination.

First of all, whether or not the posture can be determined by the hole position is judged (304). Those component parts whose postures can be judged by the hole position are classified as TYPE=1 (306). Next, whether or not the secondary moment (in the direction of the major axis) can be determined accurately is judged for the others from the ratio of the major axis to the minor axis, i.e., $|Y^2/X^2 - 1|$ (308) in order to distinguish them from symmetric component parts. Those component parts whose ratio of the major axis to the minor axis is great are not the symmetric component parts, and are therefore those component parts which have directivity such that their outer shapes can be determined primarily. Consequently, whether or not only one remotest point can be determined is judged (310), and those component parts whose postures can be determined by the remotest point are classified as TYPE=2 (312).

If the component parts are those whose major axis direction can be determined but which have at least two analogous remotest points and have also a hole or holes, such as square component parts, the hole position pattern is prepared. After a rough direction is determined by the secondary moment, whether or not the postures of such component parts can be determined by the hole position pattern is judged (314). Those component parts whose postures can be determined by the secondary moment + the hole position pattern are classified as TYPE=3 (316).

As to those component parts whose postures can not be determined by the hole position pattern such as those component parts which have no hole, whether or not their postures can be determined by the combination of the ultimate value pattern expressed by the distance connecting their outer shape to the center of gravity and the secondary moment is judged (318). The component parts whose postures can thus be determined are classified as TYPE=4 (320).

As to those component parts whose secondary moment can be determined but whose direction can not be determined evenly by the combination of the hole position pattern and the ultimate value pattern, the posture is changed by 180° on the basis of the secondary moment and matching is effected twice (322). Those component parts whose discordance exceeds a certain predetermined value are classified as TYPE=5 (324), and those which can not be judged even after the two matchings are unrecognizable pattern (326).

Next, those component parts having a small ratio of the major axis to the minor axis of the secondary moment have symmetrical shapes. For example, they are round or square. The posture of those component parts which have a hole or holes is judged by matching of the hole position pattern by preparing the hole position pattern (328). Such component parts are classified as TYPE=6 (330). Next, if the component parts have no hole, the ultimate value pattern is prepared, and the posture is judged only by the ultimate pattern (322). Such component parts are classified as TYPE=7 (334). For example, since a diamond which has no hole but is approximate to a square has four ultimate values, its posture can be judged by this method.

As to those shapes such as a circle which are relatively symmetric but do not exhibit any particular features by the hole position pattern and the ultimate value pattern, whether or not such component parts must be subjected to symmetric processing is judged (336), and if they have any symmetry, whether or not the symmetry exists is judged by the remotest point ultimate value (338) and if such symmetry exists, the component parts are classified as TYPE=8 (340). For example, they are round component parts. The component parts other than those described above are classified as an unrecognizable pattern (326).

Next, the procedures of the step 304 shown in FIG. 6 will be explained in further detail. First of all, the existence of hole is checked (402) as shown in FIG. 7, and as for those components whose hole can be primarily determined, whether or not the hole is one is judged (404), and if the holes are at least two, whether or not the longest distance from the center of gravity of the hole to the center of gravity of the component parts from its outer shape can be solely determined is judged (406).

Next, as to the accuracy, whether or not the distance between the center of gravity of the hole and the center of gravity of the outer shape of the component parts exceeds a predetermined distance is judged (408), and those component parts whose hole can be determined primarily and which satisfy the accuracy are classified as those component parts which can be judged at the hole position (410). They correspond to TYPE=1 in FIG. 6. Whether or not the posture judgement can be made by the same evaluation is made for other parameters, whenever necessary.

As described above, the types are classified into the eight types 1 through 8, and the parameters designated for each of these types are obtained at the time of recognition in order to determine the posture and to make matching.

Since the present invention automatically generates the recognition data for an arbitrary component parts as described above, it does not need the programming relating to the posture judgement for each object. Since only the necessary and sufficient parameters are calculated at the time of recognition, the operation speed can be improved. Furthermore, since the accuracy of each parameter is evaluated and guaranteed, the accuracy of the system becomes high.

Industrial Applicability

The present invention can be applied suitably to the recognition of the change of the posture due to rotation and to the recognition of those component parts having sides. Particularly, the present invention can be applied suitably to an automatic assembly system having a system configuration in which component parts on a parts feeder are taken by a TV camera, an image processor recognizes the existence, position and posture of an object component parts on the basis of the image signals and sends the data and instruction to a robot, and the robot picks up and assembles the components in accordance with the instruction.

What is claimed is:

1. A posture judgement system in an image processor which recognizes the existence, position and posture of an object and assembles the object by a robot, comprising:

means for imaging objects to provide an input image signal;

means for preparing standard data from the image input signal by classifying the image input signal as representing a:

first type of object if the posture of the object part can be determined on the basis of angles and distances between the centroid of the object and the centroid of each hole included within the object;

second type of object if the posture of the object can be determined on the basis of a ratio $|Y^2/X^2-1|$ of a major axis to a minor axis and a single longest distance connecting the centroid of the object to the periphery of the object;

third type of object if the posture of the object can be determined on the basis of the ratio of a major axis to a minor axis and a pattern of positions of a plurality of holes in the object;

fourth type of component part if the component part is neither a first, second nor third type and if the posture can be determined on the basis of the points at which successive lengths connecting the centroid on the component part and the periphery change from increasing to decreasing values, and the ratio of a major axis to a minor axis;

fifth type of component part if the component part is neither a first, second, third nor fourth type and if the posture of the component part can be determined on the basis of the ratio of a major axis to a minor axis after the posture has been changed by 180 degrees;

sixth type of component part if the posture of the component part can be determined on the basis of the ratio of a major axis to a minor axis and angles and distances between lines connecting the centroid of the component part and the centroids of each hole in the component part;

seventh type of component part if the component part is neither a first nor sixth type and if the posture of the component part can be determined on the basis of points at which the lengths connecting the centroid of the component part and the periphery of the component part change from increasing to decreasing values;

eighth type of component part if the component part is neither a first, sixth nor seventh and if the posture of the component part can be determined on the basis of a determination of senmetry;

unrecognizable pattern if the component part is neither a first, second, third, fourth, fifth, sixth, seventh nor eighth type;

and means for recognizing the posture of the desired component parts by comparing the standard data with parameters providing a basis for determining the type of component part represented by said image input signals.

2. The posture judgement system as defined in claim 1 wherein said preparing means evaluates the accuracy of each parameter at the time of the preparation of the standard data, and selects a combination of parameters that ensures the accuracy exceeding a predetermined value at the time of posture judgement.

3. The posture judgement system as defined in claim 1 wherein said parameters are a hole position of the object component parts, in direction of major axis, the remotest point, and a value pattern.

* * * * *